| United States Patent [19] | [11] | 4,069,205 |
|---|---|---|
| Marvel et al. | [45] | Jan. 17, 1978 |

[54] CYCLIC TRI(PHENYLENE DISULFIDE) POLYMERS AND THE PRODUCTION THEREOF

[75] Inventors: Carl S. Marvel; Daniel Ting-Man Wong, both of Tucson, Ariz.

[73] Assignee: University Patents, Inc., Stamford, Conn.

[21] Appl. No.: 721,899

[22] Filed: Sept. 9, 1976

Related U.S. Application Data

[63] Continuation-in-part of Ser. No. 636,801, Dec. 1, 1975, abandoned.

[51] Int. Cl.² ................ C08G 75/23; C08G 83/00
[52] U.S. Cl. .................... 260/49; 260/37 R; 260/47 R; 260/47 C; 260/61; 428/411
[58] Field of Search ............. 260/47 R, 49, 47 C, 260/61

[56] References Cited

U.S. PATENT DOCUMENTS

| 3,770,699 | 11/1973 | White | 260/49 |
| 3,907,748 | 11/1973 | Brown et al. | 260/49 |

Primary Examiner—Lester L. Lee
Attorney, Agent, or Firm—Mason, Kolehmainen, Rathburn & Wyss

[57] ABSTRACT

A tri(phenylene disulfide) polymer composed of para- or meta-tri(phenylene disulfide) units and units selected from the group consisting of diphenyl ether, bis(phenoxybenzenesulfonyl)benzene and bis(phenoxybenzenesulfonyl)diphenyl ether, is linked together with bivalent radicals selected from the group consisting of isophthaloyl and terephthaloyl radicals. In another embodiment, the tri(phenylene disulfide) can be substituted with biphenylene-2,2'-disulfide.

22 Claims, 1 Drawing Figure

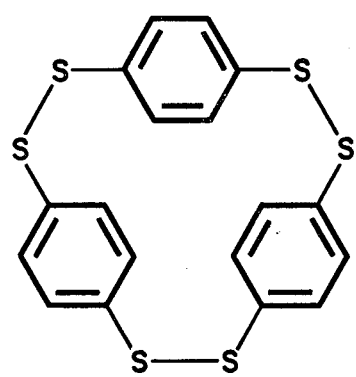
I
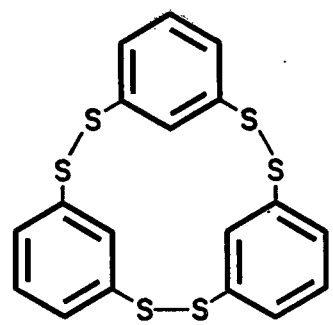
II
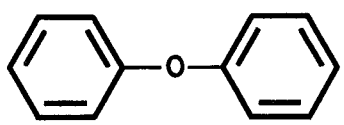
III
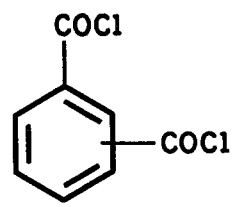
IV
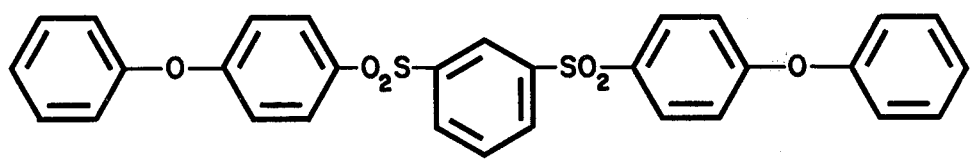
V
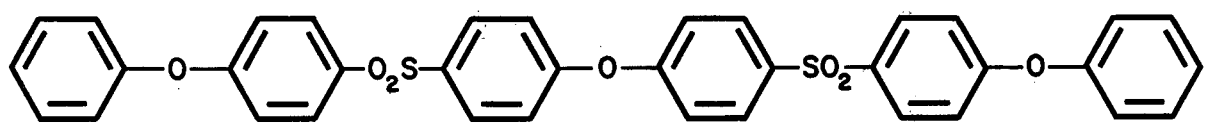
VI
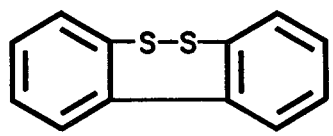
VII

CYCLIC TRI(PHENYLENE DISULFIDE) POLYMERS AND THE PRODUCTION THEREOF

CROSS-REFERENCE TO RELATED APPLICATIONS

This application is a continuation-in-part of our co-pending application Ser. No. 636,801 filed Dec. 1, 1975, now abandoned.

This invention relates to organic polymers containing tri(phenylene disulfide) or biphenylenedisulfide nuclei and to crosslinked forms of the tri(phenylene disulfide) polymers. The invention also relates to methods of producing such polymers.

CROSS REFERENCE TO RELATED APPLICATION

This application is related to our copending application Ser. No. 479,983, now U.S. Pat. No. 3,907,748.

BACKGROUND OF THE INVENTION

Filled resins, e.g., glass fiber and fabric reinforced resins, are well-known as suitable materials for forming structural units in the aircraft and other industries. A wide variety of resins have been proposed in the past for formulating such structures and as laminating resins for joining various materials. For example, polyester, epoxy and polycarbonate resins have been utilized as matrix resins for glass fiber-resin laminates. One of the difficulties experienced in the use of these resins, however, is that they are difficult to mold and mechanically work. Thus, it is often necessary to apply the resin in liquid form to the glass fibers or substrate to be laminated and then solidify the composite in order to obtain a suitable product. The resins previously used have to be melted or dissolved in a suitable solvent in order to achieve the desired liquid form. Many of these resins, however, decompose or suffer some deleterious chemical change when heated to temperatures sufficiently high to achieve melting. The result is a laminate or reinforced resin with reduced strength and physical properties.

Moreover, many of the previously used resins are insoluble in conventional volatile solvents. In addition, when forming laminates with solvent solutions of resins, it is necessary to employ special means for driving off and collecting those solvents which are capable of dissolving the resins but are relatively non-volatile.

In addition, the prior art matrix and laminating resins do not possess a sufficiently high degree of thermal stability which is requisite in many industrial applications.

It has been heretofore proposed to provide low melting laminating polymers. These polymers may be melted at low temperatures, contacted with the filler material or substrate to be laminated and cured or cross-linked to the resinous state. A serious disadvantage associated with these low-melting polymers, however, is that cross-linking involves a chemical reaction which liberates a volatile by-product such as carbon dioxide or water. The liberation of these reaction products operates to form voids in the resulting product. Obviously, the prior art low-melting laminating polymers may not be used in applications requiring close tolerance or uniform compositions throughout.

It is an object of the invention to provide low-melting polymers which may easily be admixed with fillers or contacted with substrates to be laminated and cross-linked to form a firmly bonded article having a uniform composition throughout.

It is a further object of the invention to provide novel reinforced and laminated resin compositions having high degrees of strength and thermal stability.

It is another object to provide low-melting polymers which may be cross-linked without the production of volatile materials.

SUMMARY OF THE INVENTION

The above and other objects and advantages are achieved by providing polymers containing a cyclic trimeric disulfide or a biphenylene disulfide. Para and meta cyclic trimeric disulfides corresponding to formulas I and II of the drawing are prepared by oxidation of p-phenylenedimercaptan and m-phenylenedimercaptan, respectively. The polymers of the present invention are produced from a tri(phenylene disulfide) monomer, such as tri(1,4-phenylene disulfide) or tri(1,3-phenylene disulfide), or a biphenylenedisulfide, such as biphenylene-2,2'-disulfide; and a polyaryl ether such as diphenyl ether, or a polyaryl ether sulfone such as 1,3-bis(p-phenoxybenzenesulfonyl)benzene or 4,4'-bis(p-phenoxybenzenesulfonyl)diphenyl ether, by Friedel-Crafts polymerization with isophthaloyl or terephthaloyl chloride. The dibasic phthaloyl moieties link the tri(phenylene disulfide), or biphenylenedisulfide, polyaryl ether, and/or polyaryl ether sulfone molecules together in polymers with molecular weights usually in the range of from about 15,000 to 20,000 although such polymers can exist with molecular weights as high as about 50,000. The polymers so produced are relatively low melting and are suitable for lamination. The polymers containing tri(phenylene disulfide) are readily cured or cross-linked by heating at relatively low temperatures to produce strong infusible resins. The curing temperature can be on the order of 300° C with best cures obtained at 375° C for a period of time in the range of 1-2 hours. The cured polymers are moderately heat stable in air at 300° C.

The polyaryl ether is broadly a compound of the general formula

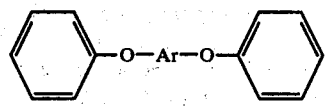

In said general formula, Ar represents a bivalent aromatic radical such as phenylene, naphthylene, and analogous bivalent radicals derived from aromatic compounds such as toluene, xylene, anthracene, fluorene, phenanthrene, acenaphthene, xanthene, pyrene, bis-(benzenesulfonyl)benzene (meta and para isomers), diphenyl sulfone, phenyl naphthyl sulfone, bis-(benzenesulfonyl)toluene, bis-(benzenesulfonyl)naphthylene, dinaphthyl sulfone, and related aromatic compounds. Preferred is the simplest polyaryl ether, diphenyl ether (III).

The weight percentages of the various components in the polymers can vary over fairly wide ranges and still provide useful products, as set forth below:

| Component | Useful Percentage | Preferred Percentage |
| --- | --- | --- |
| Tri(phenylene disulfide) | 2–20 | 3–6 |
| Diphenyl ether | 10–65 | 15–50 |

-continued

| Component | Useful Percentage | Preferred Percentage |
|---|---|---|
| Polyaryl ether sulfone | 25–75 | 40–60 |
| Biphenylene disulfide | 5–20 | 10–15 |
| Phthaloyl radical | 20–60 | 25–45 |

When the tri(phenylene disulfide) polymers of the present invention are cross-linked while in contact with a filler or substrate to be laminated, the result is a product having a high degree of strength and thermal stability wherein the cross-linked polymer is firmly adhered to the filler or substrate.

BRIEF DESCRIPTION OF THE DRAWING

Reference is made to the attached drawing illustrating by structural formula some of the separate molecular units includable in the polymers of the present invention. It is understood that when attached to other units of the polymer, interior molecular units will have two less hydrogen atoms and end (terminal) units will have one less hydrogen atom because of the bonds connecting the units. In the drawing, I represents the para-trimeric disulfide isomer, or tri(1,4-phenylene disulfide), which constitutes the cross-linking nucleus in the polymers of the present invention. The meta-isomer II, or tri(1,3-phenylene disulfide), is also useful for the cross-linking nucleus or as a portion of the cross-linking nucleus of the polymers of the present invention. A polyaryl ether, such as diphenyl ether III, and/or a polyaryl ether sulfone, such as 1,3-bis(p-phenoxybenzenesulfonyl)benzene V, or 4,4'bis(p-phenoxybenzenesulfonyl)diphenyl ether VI, also forms a portion of the polymers of the present invention. The intermediates for the polymers are isophthaloyl or terephthaloyl chloride IV (both iso' and tere' isomers are indicated by showing a bond between the ortho and meta positions on the benzene ring). The biphenylene-2,2'-disulfide unit VII can replace the tri(phenylene disulfides) I and II in producing polymers in accordance with the present invention.

In accordance with a preferred embodiment of the present invention, a tri(phenylene disulfide) monomer (I and/or II) is reacted with a polyaryl ether, such as diphenyl ether III, and one or more polyaryl ether sulfone molecules, such as V and/or VI, are joined by Freidel-Crafts polymerization with one or more of the isomeric acid chlorides IV. The polymers are made up of combinations of I and/or II, III and at least one of V and VI with phthaloyl radicals IV interconnecting them. The sequence of the I (and/or II), III, V and/or VI moieties is random with IV interconnecting them. For example, the polymer can be illustrated as follows:

$$\mathrm{-I-IV-III-IV-V-IV-I-IV-III-IV-V-IV-}_n$$

which is a regular sequence, or as follows:

$$\mathrm{-I-IV-V-IV-VI-IV-III-IV-III-IV-II-IV-}_n$$

which is random, or as follows:

$$\mathrm{-I-IV-II-IV-III-IV-VI-IV-II-IV-III-IV-}_n$$

or, $$\mathrm{-I-IV-III-IV-I-IV-III-IV-I-IV-III-IV-}_n$$

In the above formulas, $n$ represents a number from about 4 to about 17.

It should be recognized that at each I or II location, there are three sites (S—S bonds) for attachment of other moieties and, generally, the polymers can react at each of these sites so that the polymers are generally non-linear.

In accordance with another embodiment of the present invention, the biphenylene-2,2'-disulfide molecule(VII) replaces some or all of the tri(phenylene disulfide) molecules in the above described polymerization reactions and in the polymerizations described in the examples to follow.

DETAILED DESCRIPTION OF THE INVENTION

In one preferred form of the invention, the polymer is made up of I and III linked together in random sequence by iso- and/or terephthaloyl radicals IV. In another form of the invention, the polymers of the present invention are produced from II and III linked together with iso- and/or terephthaloyl radicals IV. In another form of the invention, the polymer is produced from I and/or II and III and V linked together in random sequence with isophthaloyl and terephthaloyl radicals IV. In another form of the invention, the moieties V of the above polymers can be substituted by the moiety VI or a portion of the moieties V can be replaced by the moiety VI. The quantity (moles) of iso- and/or terephthaloyl radicals is approximately equivalent to the total moles of I, II, III, V and VI. The quantity of iso- and/or terephthaloyl radicals generally lies in the range of 0.8 to 1.2 moles per total moles of I, II, III, V, VI and VII. The polymerization is carried out in the presence of anhydrous aluminum chloride in an inert solvent.

Aromatic ethers and sulfones are known to be thermally quite stable. Consequently, polymers containing these functional groups and incorporating trimeric disulfide (I or II) units or biphenylene disulfide (VII) units are materials of great potential as high temperature-resistant laminating resins.

EXAMPLE 1

A. Synthesis of tri(1,4-phenylene disulfide): I

A solution of 2 grams of p-phenylenedimercaptan in 500 ml of 95% ethanol and a solution of 3.5 grams of iodine in 500 ml of 95% ethanol were added dropwise simultaneously into a 2-liter beaker containing 1-liter of 95% ethanol and 5 ml of conc. hydrochloric acid. The solutions were added at opposite sides of the beaker to achieve the effect of high dilution. After all of the p-phenylenedimercaptan had been added, a slight excess of iodine solution was introduced to insure complete oxidation and the excess of iodine was then removed by adding sodium bisulfite. A white precipitate of polymeric material was filtered off and the solvent was evaporated. After most of the solvent had been removed the remaining solution was cooled and 0.6 grams of yellow crystals separated. After washing with water and drying under reduced pressure, the tri(1,4-phenylene disulfide) melted at 150°-152° C. The mass spectrum showed a molecular weight of 420.

Analysis: Calculated for $C_{18}H_{12}S_6$: C, 51.43%; H, 2.86%; S, 45.72%. Found: C, 51.25%; H, 2.92%; S, 45.70%.

B. Synthesis of tri(1,3-phenylene disulfide): II

In a similar procedure to that above, 6 grams of m-phenylenedimercaptan was oxidized to 4 grams of light yellow crystals. The mass spectrum showed a molecular weight of 420, the same as the calculated molecular weight. The tri(1,3-phenylene disulfide) had a melting point of b 153°-155° C.

Analysis: Calculated for $C_{18}H_{12}S_6$: C, 51.43%; H, 2.86%; S, 45.72%. Found: C, 51.62%; H, 2.98%; S, 45.87%.

EXAMPLE 2

A. Synthesis of 1,3-Bis(p-phenoxybenzenesulfonyl)benzene: V

To a solution of 137.0 grams (0.498 mole) of m-benzenedisulfonyl chloride in 170 grams of diphenyl ether was added 1.0 gram of ferric chloride. The reaction was stirred at 170° C for 24 hours. After the reaction had cooled to room temperature, ethyl ether was added and the mixture was filtered and washed with water. The ether layer was separated, filtered, and dried over $Na_2SO_4$. Evaporation of the ether and distillation of diphenyl ether under reduced pressure afforded a crude solid. The crude product then was distilled under high vacuum (0.1mm) with an open flame. The distillate solidified upon cooling and was dissolved in 40 ml of chloroform and 800 ml of ethyl ether. A small amount of insoluble black residue was filtered from the solution. The addition of 800 ml of petroleum ether precipitated 160 grams (63%) of a white powder, mp 70°-75° C.

B. Synthesis of 4,4'-Bis(p-phenoxybenzenesulfonyl)diphenyl ether: VI

To a solution of phenoxybenzene-4,4'-disulfonyl chloride (60 grams, 0.163 mole) in 400 ml of dry diphenyl ether (429.2 grams, 2.52 mole) was added 3.0 grams of ferric chloride. The mixture was stirred under nitrogen and heated to 160°-165° C for 48 hours. The cooled suspension was filtered free of ferric chloride and petroleum ether (500 ml) was added to precipitate a brown solid. The resultant precipitate was filtered and then extracted in a Soxhlet for 10 hours with 800 ml of methanol. The material not extracted by methanol was dissolved in chloroform and then passed through a short (25 cm) alumina column. Concentration of the chloroform and the addition of petroleum ether precipitated 53.4 grams (52%) of a white solid, mp 196°-200° C.

EXAMPLE 3

Synthesis of Biphenylene-2,2'-disulfide:

The procedure of Barber and Smiles, as set forth in J. Chem. Soc., 1441 (1928) as modified by the Allen, et al. procedure, J. Chem. Soc., (C), 3454 (1971), was used for this preparation. The crude product (mp 110°-113° C) was recrystallized from hot 95% ethanol. mp 113°-114° C.

Analysis: Calculated for $C_{12}H_8S_2$: C, 66.67%; H, 3.70%; S, 29.63%. Found: C, 66.63%; H, 3.84%; S, 29.53%.

POLYMERIZATIONS

The polymerizations of the following Examples 4-8 were run under anhydrous conditions in a nitrogen atmosphere at room temperature using equivalent amounts of isophthaloyl chloride and other monomers. The reactants were dissolved in dichloroethane solutions under stirring. Aluminum chloride catalyst was then added. The polymers gradually precipitated during the reaction.

EXAMPLE 4

Polymerization of Polymer A (Table I)

Tri(1,4-phenylene disulfide) [0.1512 grams or 0.360 millimole (mM)], diphenyl ether (1.5716 grams or 9.468 mM) and isophthaloyl chloride (1.9951 grams or 9.828 mM) were dissolved in 70 ml of 1,2-dichloroethane. Aluminum chloride (4 grams) was then added. The mixture was stirred at room temperature for 48 hours under nitrogen. The precipitated polymer was filtered, washed with methanol four times in a blender, and dried under vacuum at 80° C. A pale yellow powder (2.1 grams) was obtained. This polymer is indicated as polymer A in Table I. The polymer contained a small amount of alumina as indicated by the residue on combustion.

EXAMPLE 5

Preparation of Polymer B (Table I)

Tri(1,4-phenylene disulfide) (0.1000 gram or 0.238 mM), diphenyl ether (0.3348 gram or 1.9694 mM), 1.3-bis(p-phenoxybenzenesulfonyl)benzene (1.9694 mM) and isophthaloyl chloride (0.8727 gram or 4.299 mM) were dissolved in 55 ml of dichloroethane. Aluminum chloride (2.2 grams) was then added. The mixture was stirred at room temperature for 3 days under nitrogen. The precipitate was filtered and washed four times with methanol in a blender, then dried at 80° C under vacuum. A pale yellow powder (1.43 grams, 72% yield) was obtained.

EXAMPLE 6

Preparation of Polymer C (Table I)

Tri(1,3-phenylene disulfide) (0.1512 grams or 0.360 mM), diphenyl ether (1.5716 grams or 9.468 mM), and isophthaloyl chloride (1.9951 grams or 9.828 mM) were dissolved in 100 ml of 1,2-dichloroethane. Aluminum chloride (4.5 grams) was added. The mixture was stirred at room temperature under nitrogen for 18 hours. Almost no polymer precipitated out. Another portion of aluminum chloride (2.5 grams) was then added. Some polymer precipitated out in one hour. It was stirred at room temperature for another 24 hours. Then another portion of aluminum chloride (2.0 grams) was added. More precipitate was found in ½ hour. The stirring was continued until the total reaction time was 72 hours. The solvent was decanted and the polymer was washed four times with methanol in a blender. The yield was 2.75 grams or 92%.

EXAMPLE 7

Preparation of Polymer D (Table I)

Tri(1,3-phenylene disulfide) (0.100 grams or 0.238 mM), diphenyl ether (0.3348 grams or 1.9694 mM), 1,3-bis(p-phenoxybenzenesulfonyl)benzene (1.9694 mM) and isophthaloyl chloride (0.8727 grams or 4.299 mM) were dissolved in 55 ml of 1,2-dichlorethane. The mixture was stirred at room temperature under nitrogen for 63 hours. The solvent was decanted. The polymer was washed three times with methanol in a blender and dried in a vacuum at 60° C. A pale yellow powder (1.53 grams or 77% yield) was obtained.

EXAMPLE 8

Preparation of Polymer E (Table I)

Biphenylene-2,2'-disulfide (0.45 gram or 2.1 mM), 1,3-bis(p-phenoxybenzenesulfonyl)benzene (1.8257 grams or 3.4 mM), and isophthaloyl chloride (1.1125 grams or 5.5 mM) were dissolved in 60 ml of dry 1,2-dichlorethane. Aluminum chloride (3.33 grams) was then added. The mixture was stirred at room temperature under nitrogen for 24 hours. The polymer precipitate was filtered and washed four times with methanol in a blender. It was dried in a vacuum. The yeild was 1.8 grams. It was soluble in dimethylformamide.

at 360° C for 24 hours. It maintained the same melting point and still dissolved in dimethylformamide.

We claim:

1. A polymer comprising cyclic tri(phenylenedisulfide) moieties, wherein the sulfur atoms comprising the disulfide linkages are bonded together as —S—S—, and moieties of a polyaryl ether linked together with bivalent radicals selected from the group consisting of isophthaloyl and terephthaloyl radicals, said polyaryl ether being diphenyl ether or an ether of the formula

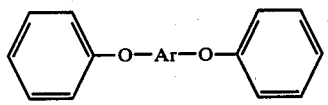

wherein Ar is bivalent aromatic radical.

2. A polymer as defined by claim 1 wherein the polyarylether comprises diphenyl ether.

TABLE I

POLYMERS A-E of EXAMPLES 4-8

| Polymer | Millimole Monomers | | | | $\eta$inh | ° C Softening Point | Analysis | | | | Residue % |
|---|---|---|---|---|---|---|---|---|---|---|---|
| | IV (iso) | III | I or II or VII | V | | | | C. % | H. % | S. % | |
| A | 9.83 | 9.47 | 0.36 I | — | 0.22$^a$ | 225–232 | Calculated | 78.51 | 3.88 | 2.30 | |
| | | | | | | | Found | 77.55 | 3.91 | 2.01 | 1.67 |
| B | 4.30 | 1.97 | 0.238 I | 1.97 | 0.23$^b$ | 200–215 | Calculated | 70.70 | 3.61 | 8.34 | |
| | | | | | | | Found | 68.62 | 3.75 | 8.51 | 1.74 |
| C | 9.83 | 9.47 | 0.36 II | — | 0.23$^a$ | 320 | Calculated | 78.51 | 3.88 | 2.30 | |
| | | | | | | | Found | 75.06 | 3.92 | 2.45 | 3.25 |
| D | 4.30 | 1.97 | 0.238 II | 1.97 | 0.23$^a$ | 190–210 | Calculated | 70.70 | 3.61 | 8.34 | |
| | | | | | | | Found | 69.29 | 3.81 | 8.43 | 1.00 |
| E | | 5.50 | 2.1 VII | 3.40 | 0.075$^c$ | 173–175 | Calculated | 68.30 | 3.40 | 11.62 | |
| | | | | | | | Found | 64.57 | 3.49 | 10.25 | 2.51 |

$^a$In conc. Sulfuric Acid.
$^b$In hexamethylphosphoric triamide (HMPA)
$^c$In dimethylformamide (DMF)

The isothermal weight losses of these polymers in circulating air at 300° C are shown in Table II.

TABLE II

ISOTHERMAL WEIGHT LOSS AT 300° C IN CIRCULATING AIR

| Polymer | Time (Days) | Wt. % loss |
|---|---|---|
| A | 9 | 6.4 |
| B | 7 | 11.2 |
| C | 7 | 8.9 |
| D | 7 | 9.5 |

Polymer A was crosslinked by heating it respectively at 310° C, 350° C and 375° C. Vicat softening curves showed that the best temperature for crosslinking was 375° C. A comparison of Vicat softening curves for polymer A, B, C and D that were crosslinked at the same temperature in the same time showed that polymers A and C had higher rigidity at high temperature, while the rigidities for crosslinked polymers B and D were relatively lower. It also showed that the para cyclic trimer (I) may be easier to open for crosslinking than the meta cyclic trimer (II). Polymers A, B, C and D in Table I are insoluble in cold dimethylformamide (DMF) or in hexamethylphosphoric triamide (HMPA), but somewhat soluble in hot DMF or hot HMPA. After crosslinking they became insoluble in these hot solvents but their IR patterns were similar to those before crosslinking.

Polymer E, containing biphenyl-2,2'-disulfide, 1,3-bis(p-phenoxybenzenesulfonyl)benzene and isophthaloyl chloride showed no crosslinking when it was heated 3. A polymer as defined by claim 1 further including moieties of a polyarylether sulfone.

4. A polymer as defined by claim 3 wherein the polyarylether sulfone comprises 1,3-bis(p-phenoxybenzenesulfonyl)benzene.

5. A polymer as defined by claim 3 wherein the polyarylether sulfone comprises 4,4'-bis(p-phenoxybenzenesulfonyl)diphenyl ether.

6. A polymer as defined by claim 3 wherein the polyaryl ether sulfone comprises both 1,3-bis(p-phenoxybenzenesulfonyl)benzene and 4,4'-bis(p-phenoxybenzenesulfonyl)diphenyl ether.

7. A polymer as defined by claim 1 wherein the ratio of total number of moles of polyaryl ether to the number of moles of tri(phenylene disulfide) is in the range of 1:1 to 20:1.

8. A polymer as defined by claim 1 wherein the average molecular weight is from about 15,000 to 50,000.

9. A polymer as defined by claim 1 wherein the total moles of isophthaloyl chloride and terephthaloyl chloride are equal to 80% to 120% of the total moles of the other components.

10. Method of producing a cyclic tri(phenylene disulfide) polymer as defined in claim 1 which comprises reacting a tri(phenylene disulfide) and a polyarylether selected from the group consisting of diphenyl ether, bis(phenoxybenzenesulfonyl)benzene, and bis(phenoxybenzenesulfonyl)diphenyl ether with an acid halide selected from the group consisting of isophthaloyl halide and terephthaloyl halide in the presence of anhydrous aluminum chloride, and separating the polymers thus formed.

11. Method of claim 10 wherein the total moles of acid halide are equal to 80% to 120% of the total moles of other components in the polymer.

12. A biphenylenedisulfide polymer comprising cyclic biphenylenedisulfide moieties, wherein the sulfur atoms comprising the disulfide linkages are bonded together as —S—S—, and moieties of a polyaryl ether as defined by claim 1, linked together with bivalent radicals selected from the group consisting of isophthaloyl and terephthaloyl radicals.

13. A polymer as defined by claim 12 wherein the polyarylether comprises diphenyl ether.

14. A polymer as defined by claim 12 further including moieties of a polyarylether sulfone.

15. A polymer as defined by claim 14 wherein the polyarylether sulfone comprises 1,3-bis(p-phenoxybenzenesulfonyl)-benzene.

16. A polymer as defined by claim 14 wherein the polyarylether sulfone comprises 4,4'-bis(p-phenoxybenzenesulfonyl)diphenyl ether.

17. A polymer as defined by claim 14 wherein the polyaryl ether sulfone comprises both 1,3-bis(p-phenoxybenzenesulfonyl)benzene and 4,4'-bis(p-phenoxybenzenesulfonyl)diphenyl ether.

18. A polymer as defined by claim 12 wherein the ratio of total number of moles of polyaryl ether to the number of moles of biphenylene-2,2'disulfide is in the range of 1:1 to 20:1.

19. A polymer as defined by claim 12 wherein the average molecular weight is from about 15,000 to 50,000.

20. A polymer as defined by claim 12 wherein the total moles of isophthaloyl chloride and terephthaloyl chloride are equal to 80% to 120% of the total moles of the other components.

21. Method of producing a biphenylenedisulfide polymer as defined in claim 12 which comprises reacting a cyclic biphenylenedisulfide and a polyaryl ether selected from the group consisting of diphenyl ether, bis(phenoxbenzenesulfonyl)-benzene, and bis(phenoxybenzenesulfonyl)diphenyl ether with an acid halide selected from the group consisting of isophthaloyl halide and terephthaloyl halide in the presence of anhydrous aluminum chloride, and separating the polymers thus formed.

22. Method of claim 21 wherein the total moles of acid halide are equal to 80% to 120% of the total moles of other components in the polymer.

* * * * *